US006628855B1

(12) United States Patent
Shen et al.

(10) Patent No.: US 6,628,855 B1
(45) Date of Patent: Sep. 30, 2003

(54) OPTICAL DIFFERENTIATION DEVICE

(75) Inventors: Alexandre Shen, Paris (FR); Jean-Guy Provost, Ste Geneviève-des-bois (FR); Fabrice Devaux, Moubrouge (FR); Bernd Sartorius, Berlin (DE); Tolga Tekin, Berlin (DE); Michael Schlak, Berlin (DE); Cristopher Janz, Nepean (CA)

(73) Assignee: Alcatel, Paris (FR)

( * ) Notice: Subject to any disclaimer, the term of this patent is extended or adjusted under 35 U.S.C. 154(b) by 158 days.

(21) Appl. No.: 09/787,892
(22) PCT Filed: Aug. 2, 2000
(86) PCT No.: PCT/FR00/02219
§ 371 (c)(1), (2), (4) Date: Mar. 28, 2001
(87) PCT Pub. No.: WO01/10045
PCT Pub. Date: Feb. 8, 2001

(30) Foreign Application Priority Data

Aug. 3, 1999 (FR) .............................. 99 10073

(51) Int. Cl.[7] .................................................. G02B 6/26
(52) U.S. Cl. .............................. 385/15; 385/42; 385/11; 385/1; 385/2; 385/3; 356/345; 356/350; 359/140
(58) Field of Search ............................... 385/15, 42, 11, 385/1–3; 356/345, 350; 359/140

(56) References Cited

U.S. PATENT DOCUMENTS 5,373,383 A * 12/1994 LaGasse ..................... 359/161

FOREIGN PATENT DOCUMENTS

| EP | 0 599 552 | 6/1994 |
| EP | 0 854 379 | 7/1998 |
| JP | 8-163026 | 6/1996 |
| WO | WO 99/41855 | 8/1999 |

OTHER PUBLICATIONS

H.K. Lee, et al., Electronics Letters, vol. 34, No. 5, pp. 478–480, "All–Fibre–Optic Clock Recovery from Non–Return–to–Zero Format Data", Mar. 5, 1988.
Patent Abstracts of Japan, vol. 1997, No. 03, Mar. 31, 1997, JP 08–288902, Nov. 1, 1996.

* cited by examiner

Primary Examiner—Robert H. Kim
Assistant Examiner—George Y. Wang
(74) Attorney, Agent, or Firm—Sughrue Mion, PLLC

(57) ABSTRACT

An optical device for the differentiation of a first optical signal and an optical signal lagging behind the first, in which the differentiation is represented by a signal carried by a continuous wave passing through the two arms of an interferometer including media with an index that depends on the optical power passing through them. The delayed signal is the first signal fed back to one of the arms through a delay.

13 Claims, 3 Drawing Sheets

OPTICAL DIFFERENTIATION DEVICE

FIELD OF THE INVENTION

This invention relates to the field of devices intended to create a difference signal between two optical signals. The invention is particularly applicable to a device for reconstituting an optical signal for transmission of data, and particularly a rectangular type signal, for example an encoded signal without a return to zero. The invention is also applicable for the generation of a clock signal at twice the frequency of the clock frequency of a first signal.

TECHNOLOGICAL BACKGROUND

An article by H. K. LEE et al entitled "All fibre optic clock recovery from non return to zero format data" published in the "Electronics Letters" journal vol. 34 No. 5, March 1998 (document 1) describes a device for reconstituting a clock signal starting from an optical signal for transmission of data encoded in a code without a return to zero (NRZ code).

A part on the input side of the device described in this article is an optical fibre differentiator that generates a signal with a pseudo return to zero (PRZ), starting from the signal in the NRZ code. The PRZ signal thus built up from the NRZ signal is then used in a known manner to lock self-oscillating means. In the case described in the article, it is a laser cavity in locked mode comprising a non-linear optical loop mirror (NOLM).

The input side differentiator device comprises an asymmetric Mach Zehnder interferometric structure with two arms, one comprising a 300 ps delay τ in the form of a 6 cm additional fibre length. The NRZ signal is input into each arm of the asymmetric Mach Zehnder interferometric structure by means of a 3 dB coupler into which the NRZ signal is input. For the rest of the presentation, it is important to note that in the experimental device described in this article, the NRZ signal was generated in place by means of a tuneable laser diode in which the continuous output wave was modulated in a modulator into which an NRZ modulation signal output by a generator of this type of signal, was input. For a good understanding of the rest of the presentation, it is also important to note that the delay τ, as described in the article in column 1 on page 479, represents the width of pulses forming the differential output signal at 3 dB. This delay τ must be equal to an odd number of half periods of the continuous carrier wave, if the destructive condition for signals present in each of the arms of the asymmetric Mach Zehnder interferometric structure is to be satisfied. To obtain this result, either the wavelength of this carrier must be varied as explained in the article at the top of column 2 on page 479 until the destruction condition is obtained, or the fibre length causing the delay between the signals propagating in each of the arms, must be varied. For obvious reasons of ease of construction, the authors chose a continuous wave generation diode, tuneable with sufficient resolution to obtain a wavelength adjustment capable of creating a phase shift satisfying the destruction condition.

The experimental device described in this article was used to obtain a PRZ signal starting from an NRZ signal at a rate of 1.5 Gigabits per second. This PRZ signal is then used to lock a clock signal reconstituting the clock signal from the NRZ signal.

Note that in the experimental device described in this article, the wavelength of the signal carrier wave is available in place and therefore that it is easy to act on it to adjust it and thus obtain the destructive condition assuming a phase shift of $(2k+1)\pi$ between the signals circulating in each of the arms of the interferometer.

It is difficult to create an industrial application of the device described in this article, since in practice it is required to reconstitute the clock signal at a regenerator starting from a carrier wave of an NRZ signal for which the wavelength is not known in advance. Furthermore, the stability of the carrier wave may not be sufficient to guarantee the destruction condition in the long term. This is why there is a need for a device capable of differentiating two signals, one of which is delayed with respect to the other, in other words a device in which the delay between the two signals can be controlled to maintain an operating difference that is equal to or close to $(2k+1)\pi$ at all times.

BRIEF DESCRIPTION OF THE INVENTION

According to the invention, the problem of the phase adjustment between the first and a second signal lagging behind the first signal, to satisfy the destructive interference condition, is solved by a device in which there is a means for creating a continuous wave. This continuous wave is sent in a first channel comprising a medium with a refraction index n that is variable as a function of a characteristic of the signal, for example the frequency or the optical power passing through the medium. This same medium that has a refraction index n, is variable as a function of a characteristic of the signal, for example the frequency or the optical power passing through it receives the first signal such that the index n of the medium is modulated by the high and low levels of the characteristic of the first signal. This continuous wave is also sent in a second channel comprising a medium in which the refraction index n is variable under the same conditions. This same medium in the second channel receives the second signal such that the index n of the medium is modulated by the high and low levels of the second signal. For example, by modulating the power level of the first and/or the second signal, the index n of the first and/or second medium is modified, and therefore the time taken by the continuous optical wave passing through these media, to pass through this medium, is modified. Therefore, the delay of one of the channels with respect to the other can be adjusted to obtain a destructive beat between the first and the second signal. When the continuous wave that followed the first channel and the continuous wave that follow the second channel are made to interfere, the phase shift between these two waves is equal to π, and the difference between the wave modulated by the first signal and a wave modulated by the second signal is determined. Therefore, this gives a signal representative of the difference between the first and second signals.

In summary, the invention relates to an optical device for the differentiation of two optical signals, a first signal and a second signal, the second signal being the same as the first signal but lagging behind it by a delay τ comprising:
  two channels, a first and a second channel, the first channel comprising a delay means for delaying the first signal input into this channel by τ, the delayed signal forming the second signal,
  means of generating a continuous wave,
  device characterised in that it comprises:
    a first medium and a second medium, with optical propagation indexes that vary with a characteristic of the optical signal passing through the said medium, placed on the first and second channels respectively,
    means of inputting firstly the first or the second signal and secondly the continuous optical wave into the first medium, and of inputting firstly the first signal and secondly the continuous optical wave into the second medium, means of making the first and second signals output from the first and second media respectively interfere with each other, a signal present at the output from these interference means making up the difference signal between the first and the second signal.

In the device according to the invention, the phase shift between the first and the second signal is independent of the wavelength of the signal carrier wave.

Delay means delaying the first signal by τ may be placed indifferently on the input side or output side of the variable index optical medium. Considering the selected vocabulary convention, if the delay τ is on the input side of the first medium the second signal is input into the first medium, whereas if the delay τ is on the output side of the first medium the first signal is input into the first medium.

Any means of multiplexing a signal input onto a channel and distributing it between two channels may be used to input the first signal onto the first and second channels, for example a 3 dB coupler or a multimode interferometric structure; the same is true for the interferometric output structure located on the output side of the first and second media.

In the preferred embodiment, the index of the first and second media varies as a function of the optical power that passes through them and are optical semiconductor amplifiers. A phase delay adjustment is obtained by adjusting the polarization current of the amplifier, modifying the amplifier gain and therefore the power level passing through the optical medium. The variation of power passing through the optical medium causes a variation of the index of this medium. Thus, it can be seen that the adjustment of the gain creates a variation of the propagation time. In this embodiment, the phase delay is preferably controlled in a closed loop in order to minimise the average level of the difference signal.

BRIEF DESCRIPTION OF THE DRAWINGS

Other advantages of the invention will become clear after reading the description of a preferred embodiment and variants that will be made below with reference to the attached drawings in which.

DETAILED DESCRIPTION OF EMBODIMENTS OF THE INVENTION

Figure 1:
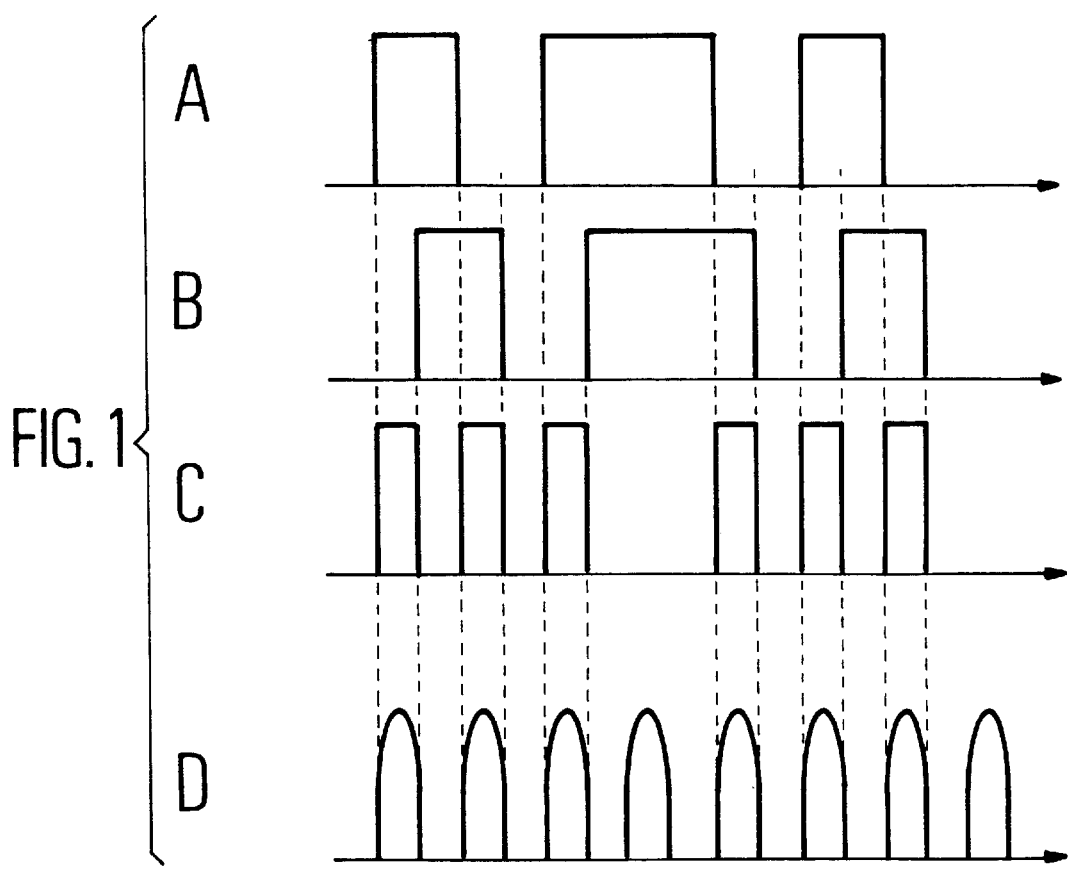
FIG. 1 represents: in part A, an example shape of the first signal, in part B, the signal of the delayed part A, in part C, the difference signal between the signals in parts A and B, in part D, a clock signal reconstituted from the pseudo clock signal represented in part C.

FIG. 1 is intended to explain what is meant by a difference signal between the first signal and the same delayed signal. Parts A and B in FIG. 1 represent the envelope of a signal and of the same delayed signal respectively. For example, it may be an NRZ transmission signal. These signals are carried by an optical carrier wave (not shown) with a very short wavelength compared with the period of the carried signal. When the delay between the first and second signals is less than the period of the carried signal, the difference signal includes a pulse as drawn in part C, with a duration that is equal to the delay, every time that the signal in part A includes a rising front or a falling front, in other words for a digital signal, every time that there is a change from 0 to 1 or from 1 to 0. In this case, pulses of the difference signal shown in part C represent clock pulses of the NRZ signal. These pulses may be used to lock a self-oscillating device, for example a laser fibre cavity in locked mode as described in the document mentioned above, or a self-oscillating diode.

Figure 2:
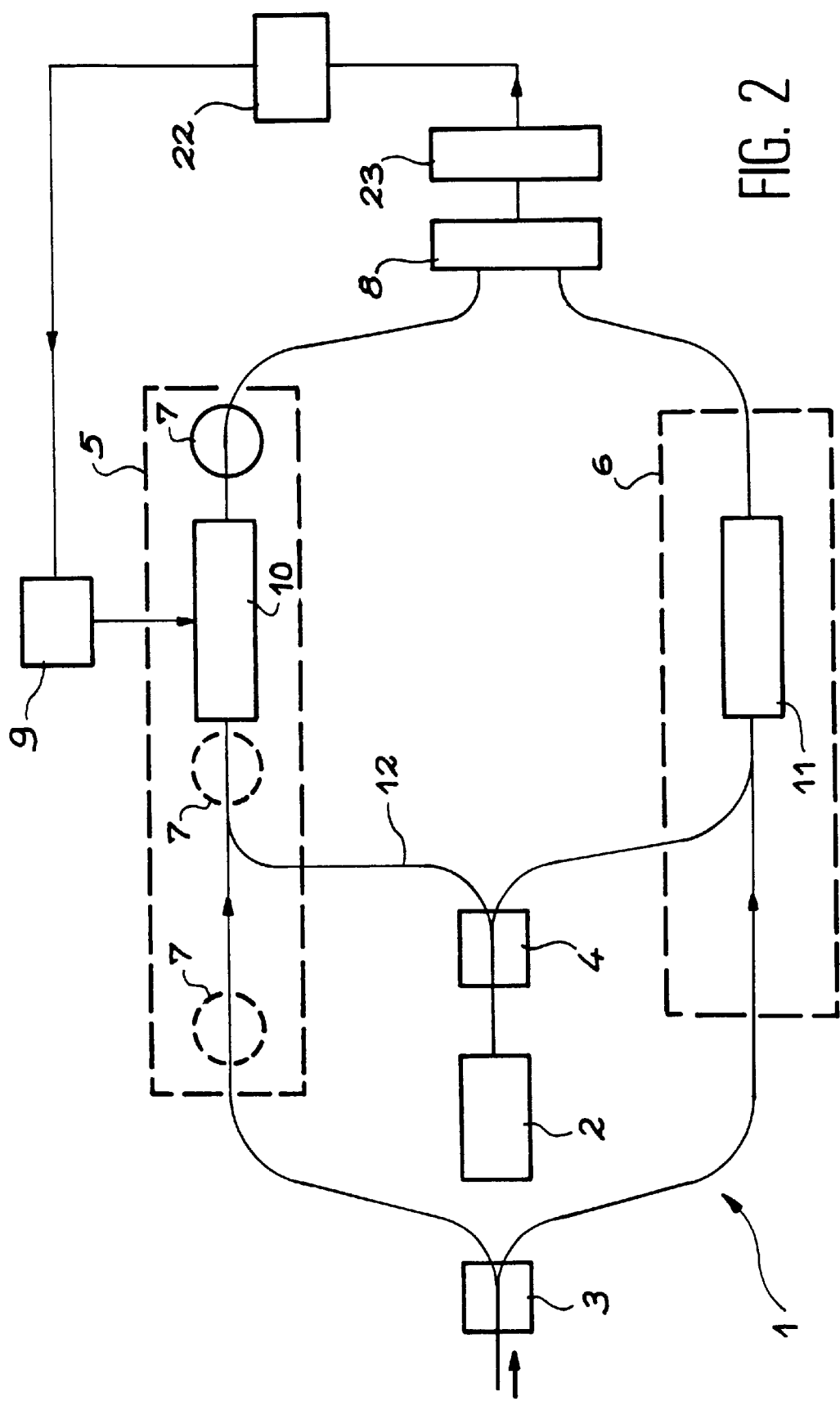
FIG. 2 is a diagrammatic view of a device according to the invention.

FIG. 2 represents an example of device 1 according to the invention. The device comprises two channels 5 and 6. A continuous optical wave generated by a continuous wave generator 2, for example a laser diode, is coupled through a coupling means 4, for example a 3 dB coupler to each of channels 5 and 6 respectively. The first signal, for example carried by an optical fibre, is also coupled through a coupling means 3, for example a 3 dB coupler, to each of channels 5 and 6 respectively. The first channel 5 comprises a delay means 7 in series with a medium 10 with a propagation index n that is variable as a function of the optical power passing through it. The second channel 6 comprises a medium 11 for which the propagation index n is variable as a function of the optical power that passes through it. In the preferred embodiment, the media 10 and 11 are composed of optical semiconductor amplifiers. In this preferred embodiment, the delay 7 and the optical semiconductor amplifier 10 for the first channel 5 were both produced on the same component. In the experimental device made in the laboratory, a Heinrich Hertz Institute (HHI) (BERLIN-DE) component was used comprising an asymmetric Mach Zehnder interferometer comprising two optical semiconductor amplifiers, four input guides and four output guides. Only the inputs and outputs used are shown in FIG. 2. This device generates a 7 picosecond delay that was found to be sufficient to obtain a difference signal, for example starting from a 2.5 Gigabit transmission signal with a bit period of 400 picoseconds or a 10 Gigabit transmission signal with a bit period of 100 picoseconds.

It was already mentioned above with regard to the description in FIG. 1, that the delay should be less than the period of the carried signal, in other words in the two cases mentioned immediately above, less than 400 and 100 picoseconds respectively. The bit time period is the maximum duration of the delay, its minimum duration has not been explored. The delay duration represents the pulse width resulting from the differentiation. These pulses should be perceptible. Work done by the applicant has shown that a delay of between about 7 picoseconds and the duration of the bit time may be suitable.

The delay means 7 may also be made using an additional fibre length on the first channel. In this case, the fibre carrying the signal on the first channel 5 is longer than the fibre carrying the signal on the second channel 6. This increased length is measured between the outputs of the coupler 3 and the input to an interferometric structure 8 into which signals on the output side of media 10 and 11 are input. The delay 7 may also be in the form of a specific component 7, and in this case it may be placed on the first channel 5 on the output side of the medium 10 or as shown in dotted lines on the input side of medium 10, while remaining on the output side of the point at which the continuous wave from the continuous wave generator 2 enters this channel. It may also be on the input side of this entry point of the continuous wave from the continuous wave generator 2, as is also shown in dashed lines.

Means 9 of adjusting a polarisation current can be used to adjust the amplification level of the optical amplifier 10, and also the crossing time through an optical medium installed in a known manner in this amplifier. In the preferred embodiment, the adjustment is made in a constant and automatic manner by means of a closed loop regulation tending to minimise the average value of an optical signal representing the difference signal directly at the output from the interferometric structure 8 or preferably on the output side of a filter 23 centred on the wavelength of the continuous wave from the continuous wave generator 2. The loop comprises an optical power detector 22 detecting the power at the output from filter 23. For example, this detector 22 may be a photodiode followed by an integrator circuit. We will now describe another embodiment with reference to FIG. 3. The embodiment shown in this figure is different from the previous embodiment due to the means of entry of the first signal and the continuous wave on channels 5 and 6. A multimode interferometer 13, for example a Fabry Perot interferometer with two inputs, a first input 14 and a second input 15. The signal is input into the first input 14. The continuous wave from the continuous wave generator 2 is input into the second input 15. Two outputs, a first output 16 and a second output 17 from the multimode interferometer 13 each receives the continuous wave from the continuous wave generator 2, and the signal. The first output 16 and the second output 17 are coupled to the first channel 5 and the second channel 6 respectively. The delay 7 is placed on the input or output side of the medium 10 on channel 5. Similarly, the output 19 from channel 5 and the output 20 from channel 6 are coupled to a first input 19 and a second input 20 to a multimode output interferometer 18. The inputs to this interferometer are marked with the same references 19, 20 as the outputs from channels 5 and 6, since the outputs from channels 5 and 6 also form the inputs to the multimode interferometer 13.

Figure 4:
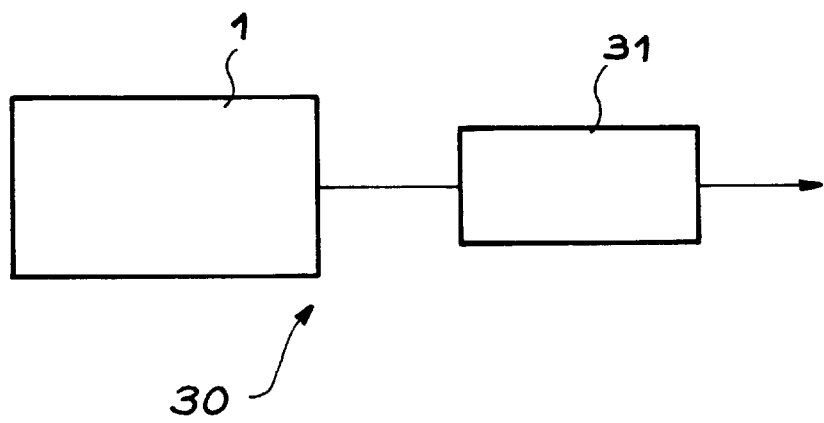
FIG. 4 is an example of a device for reconstituting a clock signal, for example an NRZ transmission signal.
Figure 3:
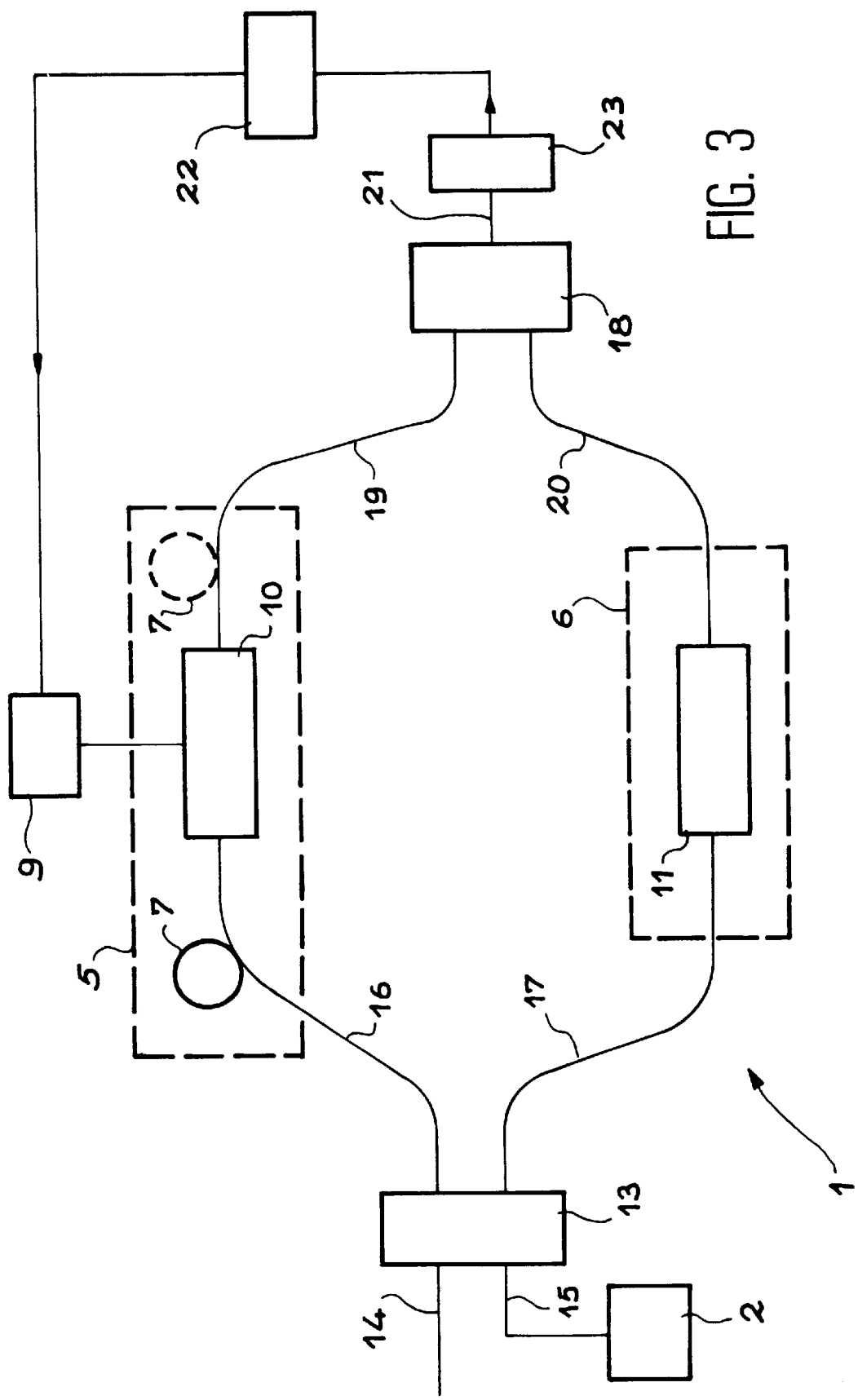
FIG. 3 is a diagrammatic view of a device according to the invention in which multimode interferometers act as the input and output structures in and outside the first and second channels respectively.

It will be noted that in the embodiments shown in FIGS. 3 and 4, the first and second channels comprise a first medium 10 and a second medium 11 respectively. Also, they may comprise or not comprise the delay 7, depending on embodiment variants. When channels 5 and 6 do not comprise the delay 7, channels 5 and 6 and the interferometric structure 8 or 18 together form a symmetric interferometric Mach Zehnder structure, the structure is asymmetric when the delay 7 is present on the channel 5 on the output side of the inputs of the signal and the continuous wave on this channel.

The operation of the device was already described above. The continuous wave and the first or second signal is input into the medium 10, for which the propagation index n is variable as a function of the optical power passing through it, such that the index n of the medium 10 is modulated by the high and low levels of the first signal. The continuous wave is also sent into the medium 11 in which the propagation index n is variable as a function of the optical power passing through the medium. This same medium 11 of the second channel receives the first signal such that the index n of the medium is modulated by the high and low levels of the first signal. By modifying the power level of the signal passing through the first medium 10, the index n of the first medium, and therefore the time taken by the continuous optical wave to pass through this medium 10, can be modified. Therefore, this provides a means of adjusting the phase shift of one of the channels with respect to the other to obtain a destructive beat between the first and the second signals. When the continuous wave that followed the first channel and the continuous wave that followed the second channel are made to interfere, there is a phase shift equal to n between these two waves, and the difference between a wave modulated by the first signal and a wave modulated by the second signal is determined every time that the power levels on media 10 and 11 are identical. Therefore, this gives a signal representative of the difference between the first and the second signal at the output from the interferometric structure 8 or 18. This signal may be used to create a signal with a constant period such as a clock signal, preferably after being filtered by filter 23.

This type of device 30 for creating a clock signal from an optical differentiation device 1 like that shown in FIG. 2 or 3, is shown in FIG. 4. The clock signal creation device 30 comprises a device 1 according to one of the embodiments of the invention. The difference signal at the output from this device 1 is received by self-oscillating means 31. For example, it may be a laser fibre cavity in locked mode or a self-oscillating diode. A self-oscillating HHI diode was used in the experimental embodiment. When the signal at the input to device 1 according to the invention is an NRZ transmission signal, the difference signal at the output from the device 1 is a pseudo signal with return to zero (PRZ). When this PRZ signal is input into the self-oscillating device 31, the clock signal of the NRZ signal is obtained at the output from the self-oscillating device 31 in a known manner.

When the signal at the input to device 1 according to the invention is a clock signal, the difference signal at the output from device 1 according to the invention is a clock signal with a frequency equal to twice the frequency of the input clock signal, since there is one output pulse for each rising or falling front of the input signal. The width of each clock pulse is an increasing function of the delay T between the two waves.

Note that when the input signal is a clock signal, a clock signal with twice the frequency is obtained directly without a self-oscillating device 31.

Thus, the device 1 according to the invention may be used to obtain a clock signal with a frequency equal to twice the frequency of an input signal composed of a first clock signal.

What is claimed is:

1. An optical device for the differentiation of two optical signals, a first signal and a second signal, the second signal being the same as the first signal but lagging behind it by a delay τ, comprising:

a first channel and a second channel, said first channel comprising a first medium having an optical index and a second channel comprising a second medium having another optical index, wherein the optical indexes of each of said first and second mediums vary with a characteristic of an optical signal passing through them:
means of generating a continuous wave;
means of making a signal present on the first channel interfere with a signal present on the second channel, an output signal from these interference means forming a difference signal between the first and the second signal;
means of inputting the continuous wave on each of the two channels, wherein the first channel also comprises:
a delay means placed in series with the first medium for delaying said first signal; and
a means of inputting the first signal on each of the channels, the input onto the first channel taking place on the input side of the series formed by the first medium and the delay means.

2. Device according to claim 1, wherein an output from the means of inputting the continuous wave onto the first channel is located on the output side of the delay means $\tau$.

3. Device according to claim 1, wherein an output from the means of inputting the continuous wave onto the first channel is located on the input side of the delay means $\tau$.

4. Device according to claim 3, wherein the means of inputting the first signal onto the first channel and onto the second channel comprise a multimode interferometric input structure with two inputs of a first input and a second input and two outputs of a first output and a second output, the first signal being applied to the first input and the continuous wave being applied to the second input, the first output being coupled to the first channel and the second output being coupled to the second channel.

5. Device according to claim 3, wherein the means of making signals output from the first channel and the second channel interfere comprise a multimode interferometric output structure with two inputs of a first input and a second input, and an output, the first input being coupled to the first channel, the second input being coupled to the second channel, the output from this multimode interferometric output structure forming the output carrying the difference signal.

6. Device according to claim 1, further comprising means of adjusting the optical propagation index of a medium with an index that varies with the optical power of the optical signal passing through the said medium, said means acting on the medium with a variable index in at least one of the channels.

7. Device according to claim 6, wherein the first medium and second medium have an optical refraction index that varies as a function of the optical power passing through it, are optical semiconductor amplifiers, and the means of adjusting the optical index is composed of means of varying the value of a polarization current of at least one of said amplifiers.

8. Device according to claim 7, further comprising detection means on the output side of the output carrying the difference signal, to detect the optical power of the difference signal, an electric signal present at the output of these means being coupled and fed back onto the means of adjusting the polarization current of at least one of the optical amplifiers in order to minimize the value of this electric signal.

9. Device according to claim 1, wherein the first signal is a digital data signal with one bit duration, and the means of introducing the delay $\tau$ introduces a delay with a duration between about 7 picoseconds and the bit duration.

10. Device according to claim 9, wherein the delay duration introduced by the means of introducing the delay $\tau$ is about 7 picoseconds.

11. A device for reconstitution of a clock signal of an optical data transmission signal, comprising:

an optical device for differentiation of two optical signals, a first signal and a second signal, the second signal being the same as the first signal but lagging behind it by a delay $\tau$, comprising:
a first channel and a second channel, said first channel comprising a first medium having an optical index and a second channel comprising a second medium having another optical index, wherein the optical indexes of each of said first and second mediums vary with a characteristic of an optical signal passing through them;
means of generating a continuous wave;
means of making a signal present on the first channel interfere with a signal present on the second channel, an output signal from these interference means forming a difference signal between the first and the second signal;
means of inputting the continuous wave on each of the two channels, wherein the first channel also comprises:
a delay means placed in series with the first medium for delaying said first signal; and
a means of inputting the first signal on each of the channels, the input onto the first channel taking place on the input side of the series formed by the first medium and the delay means, and
a triggered optical self-oscillating means located on the output side of the optical differentiation device for two optical signals, wherein the difference signal from the optical device for differentiation of the two optical signals is applied to the self-oscillating optical means, and outputting the reconstituted clock signal, the first signal in this case being the optical transmission signal.

12. The device for reconstitution of a clock signal of an optical data transmission signal according to claim 11, wherein the self-oscillating optical means comprises a self-oscillating laser diode.

13. A method of using the optical differentiation device for two optical signals according to claim 6, to create a clock signal with a frequency equal to twice the frequency of a first clock signal.

* * * * *